United States Patent
Sawyer et al.

(10) Patent No.: US 10,603,978 B2
(45) Date of Patent: Mar. 31, 2020

(54) VEHICLE AUXILIARY HVAC SYSTEM USING A COOLANT LOOP FOR COOLING A COMPONENT AND VEHICLE INTERIOR

(71) Applicant: FORD GLOBAL TECHNOLOGIES, LLC, Dearborn, MI (US)

(72) Inventors: Robert Steven Sawyer, Farmington Hills, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/215,218

(22) Filed: Jul. 20, 2016

(65) Prior Publication Data
US 2018/0022181 A1  Jan. 25, 2018

(51) Int. Cl.
*B60H 1/00* (2006.01)

(52) U.S. Cl.
CPC ..... *B60H 1/00271* (2013.01); *B60H 1/00278* (2013.01); *B60H 1/00328* (2013.01); *B60H 1/00564* (2013.01); *B60H 1/00671* (2013.01); *B60H 2001/003* (2013.01); *B60H 2001/00307* (2013.01); *B60H 2001/00721* (2013.01)

(58) Field of Classification Search
CPC ............ B60H 1/00271; B60H 1/00328; B60H 1/00564; B60H 1/00278; B60H 1/00671; B60H 2001/00307
See application file for complete search history.

(56) References Cited

U.S. PATENT DOCUMENTS

| 7,789,176 | B2 | 9/2010 | Zhou | |
|---|---|---|---|---|
| 8,753,762 | B2 | 6/2014 | Major et al. | |
| 2007/0204637 | A1 | 9/2007 | Fujii et al. | |
| 2008/0148755 | A1 | 6/2008 | Fujii et al. | |
| 2009/0071178 | A1* | 3/2009 | Major | B60H 1/00278 62/239 |
| 2009/0293521 | A1* | 12/2009 | Major | B60H 1/005 62/228.1 |
| 2010/0012295 | A1* | 1/2010 | Nemesh | B60H 1/00278 165/104.19 |
| 2011/0174000 | A1* | 7/2011 | Richter | B60H 1/00064 62/93 |
| 2013/0020046 | A1* | 1/2013 | Momose | B60H 1/00428 165/11.1 |

(Continued)

*Primary Examiner* — Kun Kai Ma
(74) *Attorney, Agent, or Firm* — David Coppiellie; King & Schickli, PLLC

(57) ABSTRACT

A vehicle includes a heating, ventilation and air conditioning (HVAC) system for heating and cooling a passenger compartment. The HVAC system includes a refrigerant loop and a coolant loop, and an auxiliary heating, ventilation and air conditioning (HVAC) system. The auxiliary HVAC includes an expansion device coupled to the refrigerant loop for controlling a flow of refrigerant to a first heat exchanger, and a second heat exchanger coupled to an auxiliary coolant loop used to regulate a temperature of the component. The auxiliary HVAC further includes a blower for creating an air flow through the first heat exchanger, a first blend door for directing the air flow through the second heat exchanger and/or an outlet, a second blend door for directing the air flow through the outlet and/or a recirculation duct, and a third blend door for controlling the air flow through the recirculation duct.

6 Claims, 5 Drawing Sheets

(56) References Cited

U.S. PATENT DOCUMENTS

| | | | |
|---|---|---|---|
| 2014/0014421 A1* | 1/2014 | Carpenter | H01M 10/5006 180/65.1 |
| 2014/0062228 A1* | 3/2014 | Carpenter | H02K 9/24 310/53 |
| 2014/0096550 A1* | 4/2014 | Gao | B60L 11/1874 62/115 |
| 2014/0144160 A1* | 5/2014 | Jackson | H01M 10/5004 62/62 |
| 2015/0032318 A1* | 1/2015 | Gao | B60L 3/12 701/22 |
| 2016/0159203 A1* | 6/2016 | Kuroda | F25B 5/02 62/160 |
| 2016/0193896 A1* | 7/2016 | Miyakoshi | B60H 1/00385 62/155 |
| 2016/0297280 A1* | 10/2016 | Riederer | B60H 1/00278 |
| 2017/0054188 A1* | 2/2017 | Blatchley | H01M 10/663 |

* cited by examiner ly known to utilize auxiliary heating, ventilating, and air conditioning (HVAC) systems in vehicles. These auxiliary HVAC systems are typically either a blended air system, which is similar to a forced air HVAC system used as a primary HVAC system, or an air conditioning only or heater only system. These auxiliary HVAC systems are typically positioned within a passenger compartment of the vehicle. More specifically, auxiliary HVAC systems are often positioned either in the rear trim assembly, a center console, under a seat, under the vehicle, or otherwise within the compartment.

VEHICLE AUXILIARY HVAC SYSTEM USING A COOLANT LOOP FOR COOLING A COMPONENT AND VEHICLE INTERIOR

TECHNICAL FIELD

This document relates generally to vehicle heating/cooling systems, and more specifically to an auxiliary vehicle heating, ventilating, and air conditioning system with an auxiliary coolant loop to cool a component.

BACKGROUND

It is well known to utilize auxiliary heating, ventilating, and air conditioning (HVAC) systems in vehicles. These auxiliary HVAC systems are typically either a blended air system, which is similar to a forced air HVAC system used as a primary HVAC system, or an air conditioning only or heater only system. These auxiliary HVAC systems are typically positioned within a passenger compartment of the vehicle. More specifically, auxiliary HVAC systems are often positioned either in the rear trim assembly, a center console, under a seat, under the vehicle, or otherwise within the compartment.

As with the primary HVAC system, these auxiliary HVAC systems typically have a large footprint or package size considering their positioning within the passenger compartment. In fact, these auxiliary HVAC systems often include some or all of the following: an evaporator core, a heater core, an electric heater, a blower motor and wheel assembly, a blower speed controller, doors, actuators and ducts. Even more, the duct system for the auxiliary HVAC system in larger vehicles, such as sports utility vehicles (SUVs), crossover utility vehicles (CUVs), vans and hybrid vehicles, is typically extensive and extends throughout the passenger compartment in order to distribute conditioned air to varied locations within the compartment (e.g., a second, a third, a fourth, or a fifth row of the vehicle).

While the larger vehicles may provide more cubic feet within the passenger compartment than smaller, more compact, vehicles, the additional space is often utilized for various desired features (e.g., three plus person seating across each row of the passenger compartment). In these scenarios, space within the passenger compartment can become limited. Accommodating this type of seating arrangement or other desired features and a large auxiliary HVAC system, for example, can be difficult and burdensome on vehicle designers. Accordingly, a need exists for an auxiliary HVAC system capable of heating and cooling a passenger compartment, or zones within a passenger compartment, while maintaining a minimal footprint or package size to provide increased flexibility for the vehicle designers.

The auxiliary HVAC system would utilize an auxiliary coolant loop system which is small in size and allows for shorter duct runs for multi-zone conditioning throughout the passenger compartment. Even more, fewer and/or possibly smaller heat exchangers can be utilized limiting the overall package size or footprint of the auxiliary HVAC system. Such an auxiliary HVAC system could also provide spot heating and cooling for lower energy consumption compared to full passenger compartment solutions, and component cooling where components are temperature critical (e.g., a battery pack).

SUMMARY OF THE INVENTION

In accordance with the purposes and benefits described herein, a vehicle is provided. The vehicle may be broadly described as comprising a heating, ventilation and air conditioning (HVAC) system for heating and cooling a passenger compartment, the HVAC system including a refrigerant loop and a coolant loop, and an auxiliary heating, ventilation and air conditioning (HVAC) system including an expansion device coupled to the refrigerant loop for controlling a flow of refrigerant to a first heat exchanger, and a second heat exchanger coupled to an auxiliary coolant loop including a pump for moving a coolant, within the auxiliary coolant loop, near a component in order to regulate a temperature of the component.

The temperature of the coolant within the auxiliary coolant loop is controlled utilizing the flow control valve and the pump.

In one possible embodiment, the auxiliary HVAC system further includes a blower for creating an air flow through the auxiliary HVAC system, and the first heat exchanger is a refrigerant to air heat exchanger and the second heat exchanger is an air to coolant heat exchanger.

In another possible embodiment, the auxiliary HVAC system further includes a blower for creating an air flow through the auxiliary HVAC system and a first blend door, the first blend door positioned downstream of the first heat exchanger for directing the air flow at least partially through an outlet in a passenger compartment cooling mode.

In still another possible embodiment, the auxiliary HVAC system further includes a blower for creating an air flow through the auxiliary HVAC system and a first blend door, the first blend door positioned downstream of the first heat exchanger for directing the air flow at least partially through the second heat exchanger in a component cooling mode.

In yet still another possible embodiment, the auxiliary HVAC system further includes a recirculation duct through which the air flow directed at least partially through the second heat exchanger returns to the blower.

In another possible embodiment, the auxiliary HVAC system further includes a second blend door, the second blend door positioned downstream of the first blend door for further directing the air flow directed at least partially through the second heat exchanger through the recirculation duct.

In yet another, the auxiliary HVAC system further includes a blower for creating an air flow through the auxiliary HVAC system, a first blend door positioned downstream of the first heat exchanger for directing a first portion of the air flow through an outlet and into the passenger compartment and a second portion of the air flow through the second heat exchanger, and a second blend door and a third blend door both positioned downstream of the first blend door for further directing the second portion of the air flow through the outlet, through a recirculation duct back to the blower, or through the outlet and the recirculation duct back to the blower.

In a second possible embodiment, an auxiliary heating, ventilation and air conditioning (HVAC) system for heating and cooling a passenger compartment and cooling a component via an auxiliary coolant loop, includes an expansion device for controlling a flow of refrigerant to a first heat exchanger, a second heat exchanger coupled to the auxiliary coolant loop for regulating a temperature of the component, a blower for creating an air flow through the first heat exchanger, a first blend door downstream of the first heat exchanger for directing the air flow through the second heat exchanger and/or an outlet into the passenger compartment, a second blend door downstream of the first blend door for directing the air flow through the outlet and/or a recirculation duct back to the blower, and a third blend door downstream of the first blend door for controlling the air flow through the recirculation duct.

In one possible embodiment, the component is one or more power storage devices (e.g., a battery), the first heat exchanger is a refrigerant to air heat exchanger, and the second heat exchanger is an air to coolant heat exchanger.

In another possible embodiment, the first blend door directs the air flow through the outlet in a passenger compartment cooling mode. In still another, the first blend door directs the air flow through the second heat exchanger in a component cooling mode.

In still yet another possible embodiment, the second blend door directs the air flow through the third blend door and the recirculation duct in the component cooling mode.

In still another possible embodiment, the first blend door directs a first portion of the air flow through the outlet and a second portion of the air flow through the second heat exchanger in a blended cooling mode.

In another possible embodiment, the second blend door directs the second portion of air flow through the second heat exchanger through the outlet. In still another possible embodiment, the third blend door directs at least a portion of the second portion of air flow through the second heat exchanger through the recirculation duct.

In accordance with the purposes and benefits described herein, a method is provided of cooling a component in a vehicle having an auxiliary heating, ventilation and air conditioning (HVAC) system including an auxiliary coolant loop comprising the steps of: (a) creating an air flow through a first heat exchanger to lower a temperature of the air flow; (b) directing at least a portion of the lowered temperature air flow through a second heat exchanger; (c) pumping coolant through the auxiliary coolant loop to draw heat away from the component; and (d) changing a temperature of the coolant within the auxiliary coolant loop utilizing the second heat exchanger.

In another possible embodiment, the step of changing a temperature of the coolant includes controlling a flow of coolant through the second heat exchanger utilizing a flow valve.

In yet another possible embodiment, substantially all of the lowered temperature air flow is directed through the second heat exchanger in a component cooling mode.

In still another possible embodiment, the method further includes the step of (e) recirculating the lowered temperature air flow directed through the second heat exchanger back to the blower.

In one other possible embodiment, the method further includes the steps of (f) recirculating a first portion of the portion of the lowered temperature air flow directed through the second heat exchanger, and (g) directing a second portion of the portion of the lowered temperature air flow directed through the second heat exchanger through an outlet into a passenger compartment in a blended cooling mode.

In the following description, there are shown and described several embodiments of a vehicle utilizing an auxiliary HVAC system including an auxiliary coolant loop for controlling a temperature of a component. As it should be realized, the methods and systems are capable of other, different embodiments and their several details are capable of modification in various, obvious aspects all without departing from the vehicles and methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle and methods and together with the description serve to explain certain principles thereof. In the drawing figures.

Figure 4:
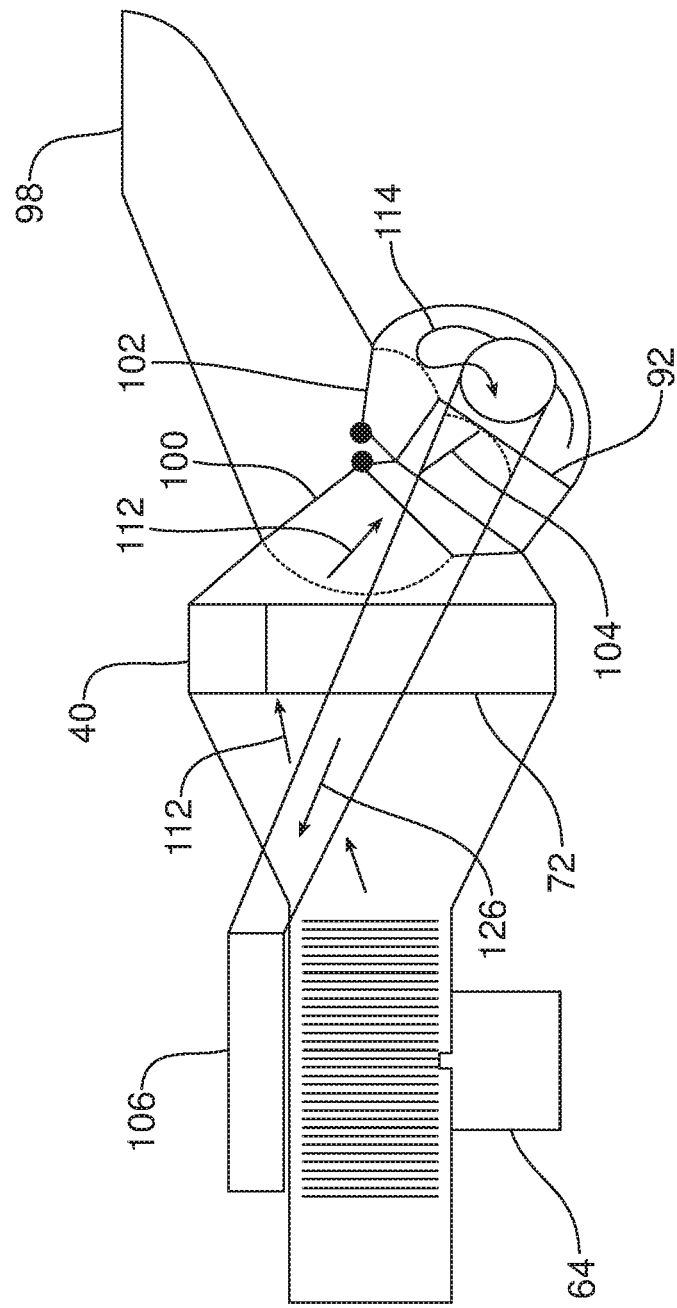
Figure 5:
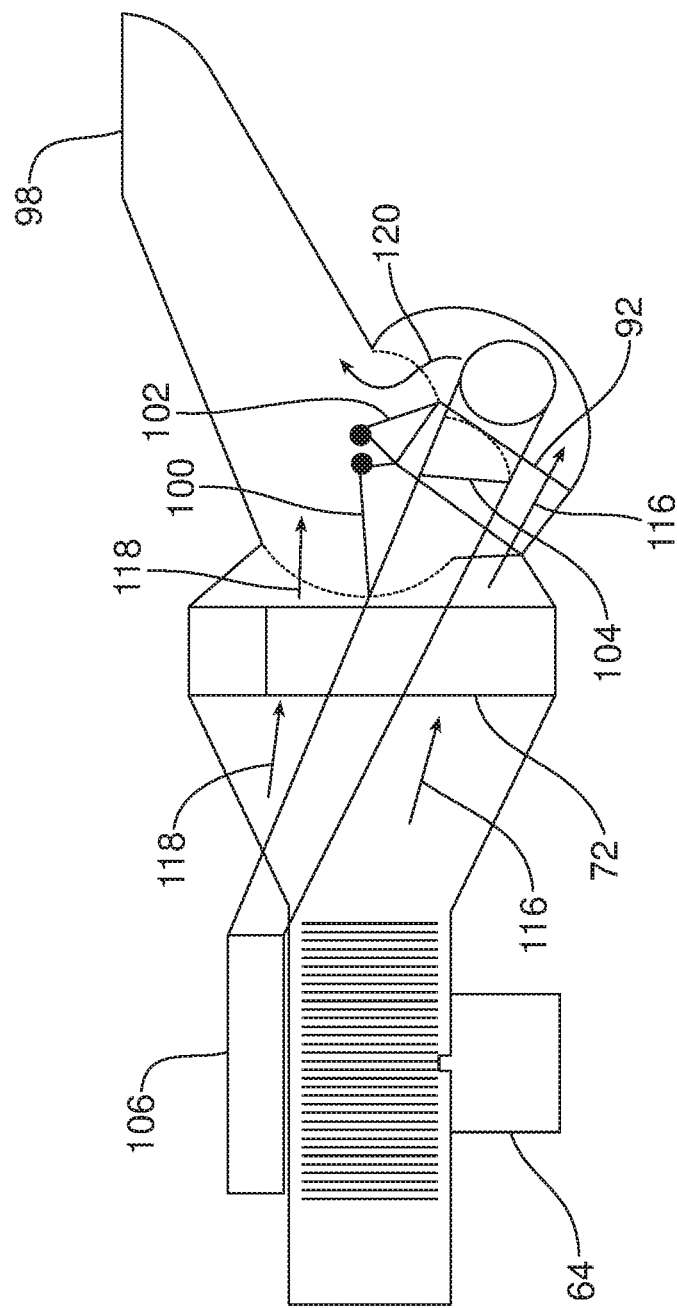

FIG. 4 is a side view of the auxiliary (HVAC) system including first, second and third blend doors configured for directing air flow through the recirculation duct in a component cooling mode; and FIG. 5 is a side view of the auxiliary (HVAC) system including first, second and third blend doors configured for directing portions of the air flow through the outlet and the recirculation duct in a blended cooling mode.

Reference will now be made in detail to the present embodiments of the vehicle utilizing an auxiliary HVAC system including an auxiliary coolant loop for controlling a temperature of a component of the vehicle, examples of which are illustrated in the accompanying drawing figures, wherein like numerals are used to represent like elements.

DETAILED DESCRIPTION

Figure 1:
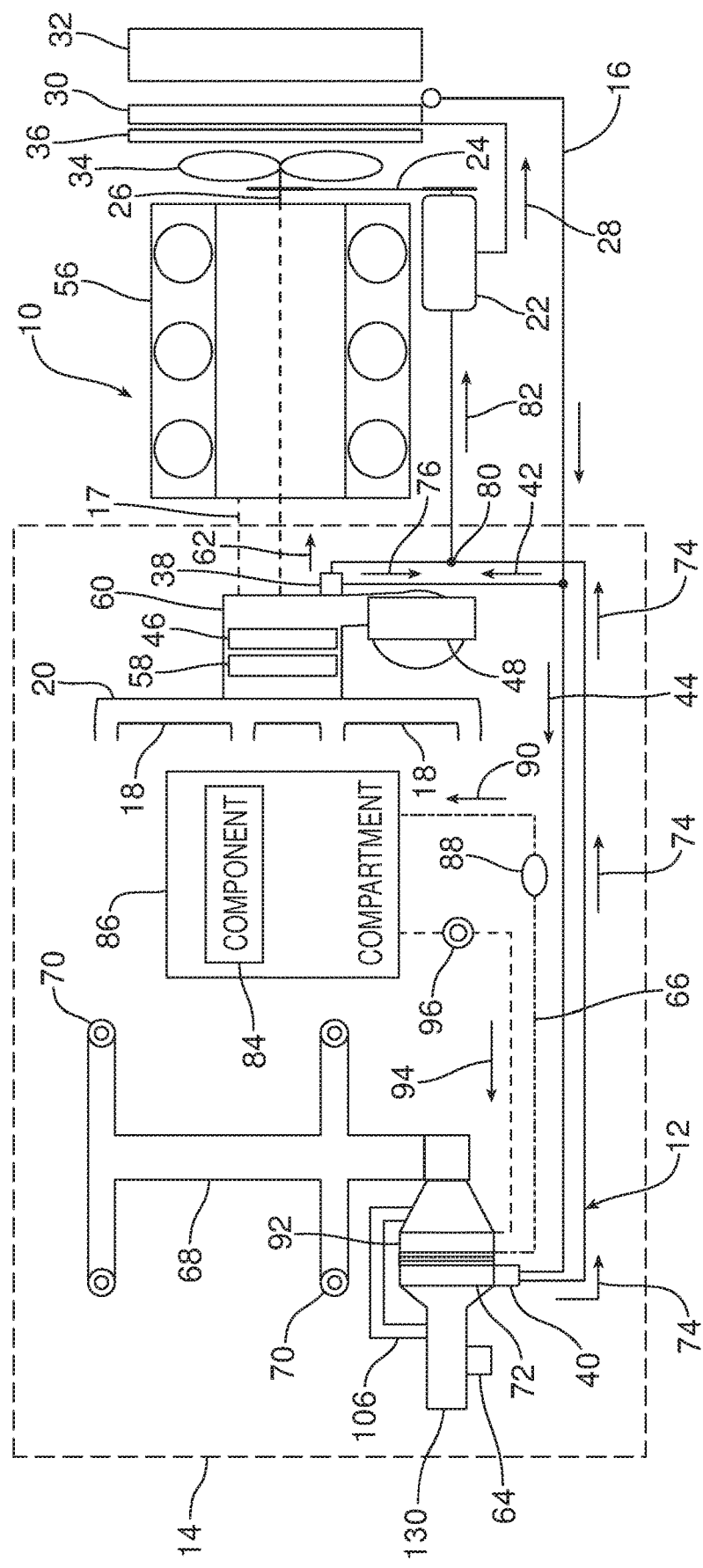
FIG. 1 is a schematic diagram of a vehicle heating, ventilation and air conditioning (HVAC) system and an auxiliary HVAC system including an auxiliary coolant loop for controlling a temperature of a component of the vehicle.

Reference is now made to FIG. 1 illustrating a schematic diagram of a typical vehicle heating and cooling system 10 coupled to an auxiliary heating, ventilation and air conditioning (HVAC) system 12 for heating and cooling a passenger compartment 14. The vehicle cooling and heating system 10 includes a main heating, ventilation and air conditioning (HVAC) system including a refrigerant loop 16 and an engine coolant loop 17 (shown in dashed line) for heating and cooling the passenger compartment 14 through vents 18 positioned within an instrument panel 20.

In the described embodiment, the refrigerant loop 16 includes a traditional compressor 22 driven by a compressor belt 24 which in turn is driven by a crankshaft 26 of the vehicle. In operation, the compressor 22 compresses a fluid, which is a refrigerant in the described embodiment, thereby raising a temperature (T) of the refrigerant. The high temperature, high pressure gas refrigerant leaves the compressor 22, as shown by action arrow 28, and flows into a condenser 30.

Broadly speaking, the condenser 30 is positioned in the described embodiment at a front section of an engine compartment and cools the refrigerant. Within the condenser, or outside heat exchanger 30, the high temperature, high pressure gas refrigerant is condensed due primarily to the effect of outside air, and liquefied. The vehicle may include active grill shutters 32 which control an amount of air allowed to pass over the outside heat exchanger 30. As shown, a fan 34 is also utilized in the described embodiment to create and regulate the flow of air through the active grill shutters 32, over the outside heat exchanger 30 and an engine radiator 36.

The high pressure, liquefied refrigerant is then sent to a first (cooling) expansion device 38 and a second (cooling) expansion device 40, as shown by action arrows 42 and 44 respectively. In the first (cooling) expansion device 38, the liquid refrigerant is expanded to become a low-temperature, low-pressure liquid and vapor mixture refrigerant. This low-temperature, low-pressure liquid and vapor mixture refrigerant is supplied to a refrigerant to air heat exchanger, or evaporator, designated numeral 46. Regulation of the flow of refrigerant, or throttling, is used to control the temperature of the refrigerant within the evaporator 46.

In a cooling mode, warm, moist air flowing across the evaporator 46 transfers its heat to the cooler refrigerant within the evaporator. The byproducts are a lowered temperature air and condensation from the air. The condensation is routed from the evaporator 46 to an exterior of the vehicle. A blower 48 blows air across the evaporator 46 and through the one or more vents 18 to the passenger compartment 14. This process results in the passenger compartment 14 having a cooler, drier air therein.

As indicated above, the system 10 further includes an engine coolant loop 17 including a coolant pump (not shown) that pumps coolant or antifreeze through the engine 56. The coolant draws heat from the engine 56 and routes a portion of the heated coolant through a coolant to air heat exchanger 58 positioned within the vehicle HVAC case 60.

In a heating mode, a blend door (not shown) is used to regulate the flow of air created by the blower 48 allowing air to travel through, or partially through, the coolant to air heat exchanger 58. The heated coolant flowing through the coolant to air heat exchanger 58 transfers its heat to the air flowing across the coolant to air heat exchanger. The byproducts are a raised temperature air entering the passenger compartment 14 through vents 18 and a lowered temperature coolant. The now lowered temperature engine coolant flowing from the coolant to air heat exchanger 58, as shown by action arrow 62, moves back through the engine 56 where the coolant is reheated and cycled through the system 10 as described above.

The auxiliary HVAC system 12 provides auxiliary cooling of at least portions of the passenger compartment 14 through ducting 68 and one or more vents 70 positioned within the passenger compartment. In the second (cooling) expansion device 40, the liquid refrigerant is similarly expanded to become a low-temperature, low-pressure liquid and vapor mixture refrigerant. This low-temperature, low-pressure liquid and vapor mixture refrigerant is supplied to a refrigerant to air heat exchanger, or evaporator, designated numeral 72. Regulation of the flow of refrigerant, or throttling, is used to control the temperature of the refrigerant within the evaporator 72. In the described embodiment shown in FIG. 1, the evaporator 72 is positioned within an auxiliary HVAC case 130 located in the passenger compartment 14. In alternate embodiments, however, the auxiliary HVAC case and/or evaporator 72 may be located under the vehicle, or within an engine or other compartment.

In a cooling mode, warm, moist air flowing across the evaporator 72 transfers its heat to the cooler refrigerant within the evaporator. The byproducts are a lowered temperature air and condensation from the air. The condensation is routed from the evaporator 72 to an exterior of the vehicle. A blower 64 creates the flow of air across the evaporator 72 and through the one or more vents 70 to the passenger compartment 14. This process results in the passenger compartment 14 having a cooler, drier air therein.

The low pressure refrigerant exits the refrigerant to air heat exchanger 72, as shown by action arrows 74, and recombines with low pressure refrigerant exiting evaporator 46, as shown by action arrow 76, at point 80. The combined low pressure refrigerant reenters the compressor 22, as shown by action arrow 82, where the refrigerant is again compressed and cycled through the system 10.

The auxiliary HVAC system 12 further includes an auxiliary coolant loop 66 for regulating a temperature of a component 84 (e.g., a battery, electronics, or food/drinks) within a compartment 86. The auxiliary coolant loop 66 includes a coolant pump 88 that pumps coolant or antifreeze through the compartment 86 as shown by action arrow 90. The coolant in the auxiliary coolant loop 66 absorbs heat from the component 84 as the coolant passes through the compartment 86 before being pumped into an air to coolant heat exchanger 92 as shown by action arrow 94.

The pump 88 and a flow control valve 96 work together to control the temperature of the coolant within the auxiliary coolant loop 66. In the cooling mode described above wherein maximum cooling of the passenger compartment 14 is desired, the flow control valve 96 and pump 88 limit, if not stop, movement of the coolant within the auxiliary coolant loop 66. Alternatively, in a maximum component cooling mode, the flow control valve 96 and pump 88 allow the coolant to flow past the component 84 within the compartment 86.

Figure 2:
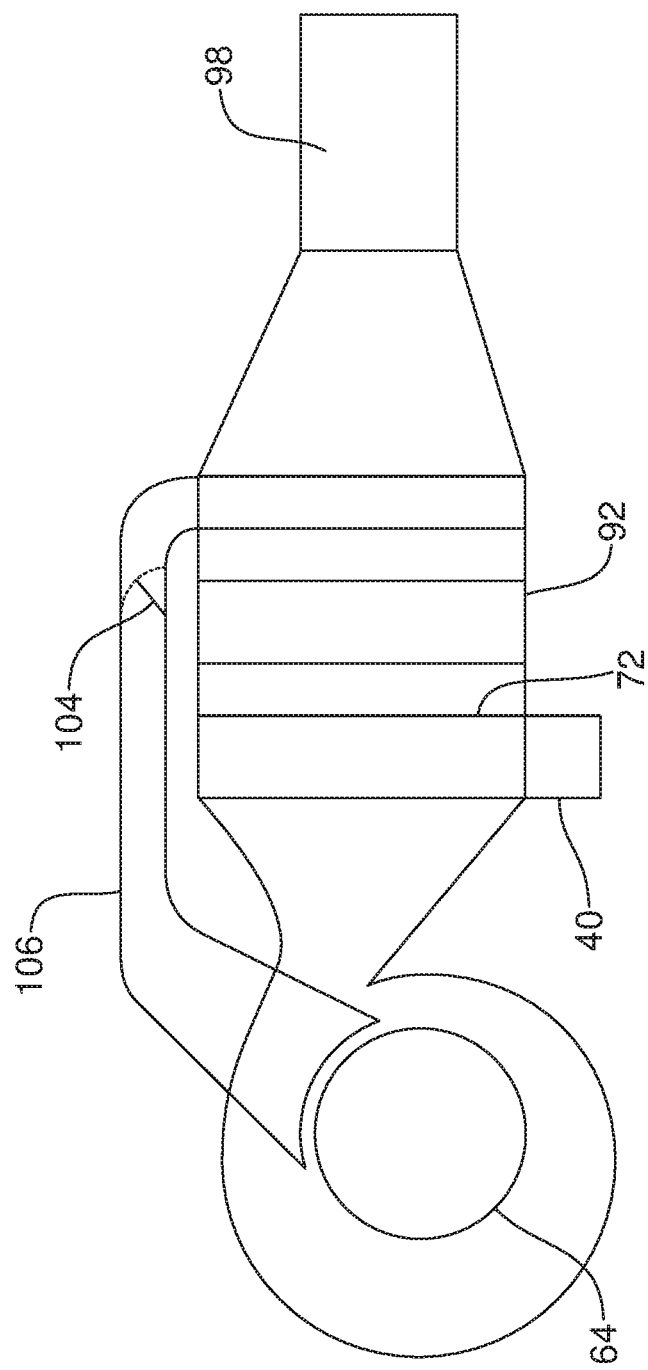
FIG. 2 is a top view of an auxiliary (HVAC) system including a blower for creating an air flow, first and second heat exchangers, an outlet, a recirculation duct, and an expansion device.
Figure 3:
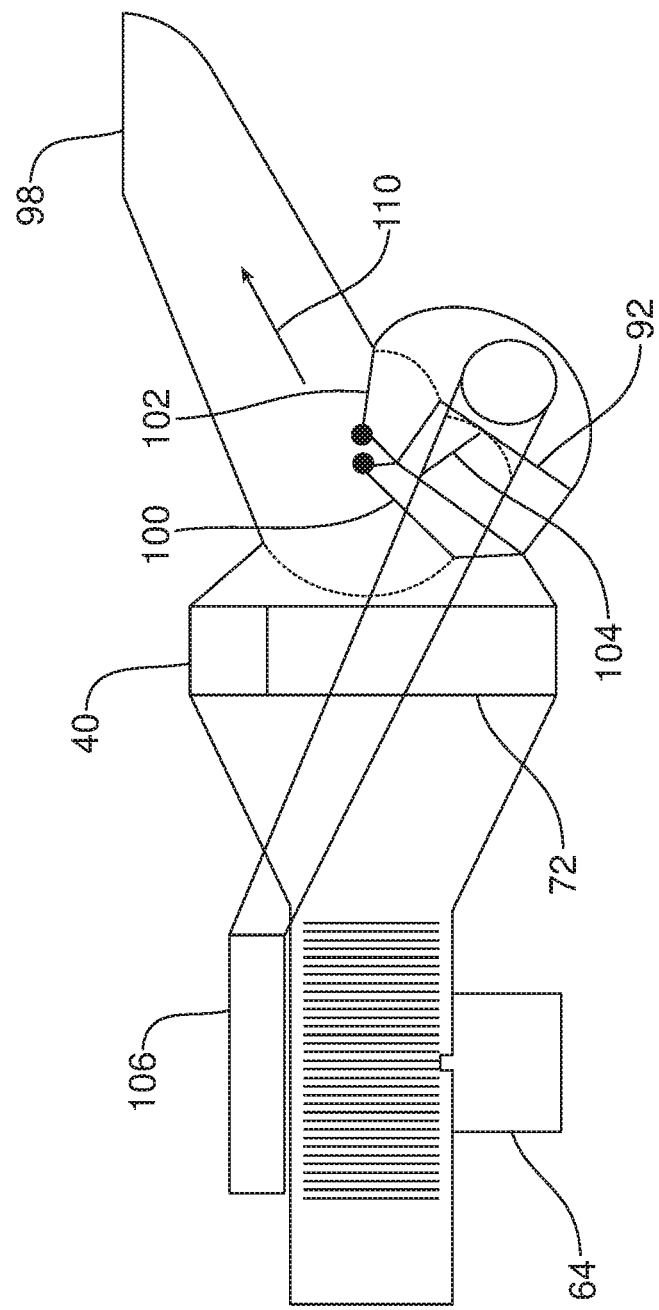
FIG. 3 is a side view of the auxiliary (HVAC) system including first, second and third blend doors configured for directing air flow into a passenger compartment in a passenger compartment cooling mode.

As generally shown in FIG. 2, the auxiliary HVAC system 12 includes the expansion valve 40, the blower 64, the refrigerant to air heat exchanger, or evaporator, 72, the air to coolant heat exchanger, or heater core, 92, an outlet 98 connected to the ducting 68, and a recirculation duct 106 and blend door 104. Even more, as shown in FIG. 3, the auxiliary HVAC system 12 includes first, second, and third blend doors 100, 102, and 104, respectively. The blend doors are used to control and/or regulate the flow of air created by the blower 64.

In the maximum passenger compartment cooling mode shown in FIG. 3, the first blend door 100 and the second blend door 102 are moved to fully closed positions. In these positions, the first and second blend doors 100, 102 prevent the blown air from travelling through the air to coolant heat exchanger 92 and a recirculation duct 106 back to the blower 64. In this mode, the coolant pump 88 is turned off and coolant is not circulated through the auxiliary coolant loop 66 and component compartment 86, and the blown air flows directly into the passenger compartment 14, as shown by action arrow 110, via ducting 68.

In a maximum component cooling mode shown in FIG. 4, the first blend door 100 is moved to a fully open position generally preventing the blown air from entering the passenger compartment 14 via outlet 98. In this mode, the first blend door 100 directs the blown air through the coolant to air heat exchanger 92 as shown by action arrows 112. The portion of the heated coolant flowing through the coolant to air heat exchanger 92 transfers its heat to the air flowing across the coolant to air heat exchanger. The byproducts are a raised temperature air and a lowered temperature coolant within the auxiliary coolant loop 66.

The second blend door 102 is similarly moved to a fully closed position in the maximum component cooling mode thereby generally preventing the raised temperature air from entering the passenger compartment 14 via outlet 98. Instead, the third blend door 104 is opened allowing the heated air flowing through the coolant to air heat exchanger 92 into the recirculation duct 106 as shown by action arrows 114. The heated air flows through the recirculation duct 106 back to the blower 64 where it is recirculated through the evaporator 72 and cooled prior to entering the coolant to air heat exchanger 92. In other words, in the maximum component cooling mode, the first and second blend doors 100 and 102 are positioned to prevent air flow from entering the passenger compartment 14 and the third blend door 104 is positioned to direct the heated air into the recirculation duct 106 and back to the blower 64.

In one blended mode shown in FIG. 5, the third blend door 104 is moved to a fully closed position generally preventing air from entering the recirculation duct 106. At the same time, the first and second blend doors 100 and 102 are used to regulate the flow of air created by the blower 64. As shown, both the first and second doors are positioned to allow the flow of air to travel partially through the coolant to air heat exchanger 92 as shown by action arrows 116 and partially bypass the coolant to air heat exchanger 92 into the passenger compartment 14 as shown by action arrows 118.

The portion of the heated coolant flowing through the coolant to air heat exchanger 92 transfers its heat to the air flowing across the coolant to air heat exchanger. The byproducts are a raised temperature air entering the passenger compartment 14 via outlet 98, as shown by action arrow 120, and a lowered temperature coolant. Before entering the passenger compartment 14, the raised temperature air is blended with the portion of the air flow allowed to bypass the coolant to air heat exchanger 92 into the passenger compartment 14 as shown by action arrows 118. Positioning of the first and second blend doors 102 and 104 is one method of controlling the temperature of the blended air entering the passenger compartment 14. In alternate modes of operation, the third blend door 104 may be opened or partially opened allowing at least a portion of the raised temperature air to enter the recirculation duct 106 as described above.

In the heating mode, with the compressor off, no refrigerant is moving through the second (cooling) expansion device 40 or the refrigerant to air heat exchanger 72. In this mode, the pump 88 may likewise be turned off such that no coolant is moving within the auxiliary coolant loop 66. Alternatively, the pump 88 may continue to operate pumping coolant through the auxiliary coolant loop 66 such that the coolant is warmed by a transfer of heat within the compartment 86. The warmed coolant then moves to the coolant to air heat exchanger 92 where the warmed coolant transfers heat to the air flowing across the coolant to air heat exchanger created by the blower 64. The warmed air flows through outlet 98 and to one or more vents 70 positioned within the passenger compartment 14 through ducting 68. This process results in at least a portion of the passenger compartment 14 having a warmer air therein and provides cooling to the component 84 within the compartment 86.

In other alternate embodiments, a valve may be added to the auxiliary coolant loop 66 for selectively directing the moving coolant through one or more additional compartments for housing one or more additional components in order to regulate a temperature of the components. The valve would operate to allow the coolant to move normally within the auxiliary coolant loop or to be diverted through the one or more additional compartments when component cooling is desired. Of course, one or more valves may be added to the auxiliary coolant loop if multiple compartments are utilized within the vehicle.

In summary, numerous benefits result from the vehicle utilizing an auxiliary HVAC system for controlling a temperature within a passenger compartment and cooling a component using an auxiliary coolant loop as illustrated in this document. The auxiliary coolant loop maintains the component within an optimum temperature range while waste heat from the component is utilized to reheat the auxiliary discharge air. The use of an auxiliary HVAC system provides increased flexibility for vehicle designers including allowing shorter duct runs for multi-zone air conditioning throughout the passenger compartment and the utilization of fewer and/or possibly smaller heat exchangers. Even more, the system allows for spot heating and cooling resulting in lower energy consumption compared to full passenger compartment solutions, and component cooling without significantly effecting the temperature of the passenger compartment, if at all.

The foregoing has been presented for purposes of illustration and description. It is not intended to be exhaustive or to limit the embodiments to the precise form disclosed. For example, the expansion devices in the described embodiment could be electronic expansion devices. Obvious modifications and variations are possible in light of the above teachings. All such modifications and variations are within the scope of the appended claims when interpreted in accordance with the breadth to which they are fairly, legally and equitably entitled.

What is claimed:

1. A vehicle, comprising:
    a heating, ventilation and air conditioning (HVAC) system for heating and cooling a passenger compartment, said HVAC system including a refrigerant loop including a compressor, a condenser, a first expansion valve, a first refrigerant to air heat exchanger, and a first blower, and a coolant loop including a coolant pump that pumps coolant through an engine; and
    an auxiliary heating, ventilation and air conditioning (HVAC) system for heating and cooling a passenger compartment and cooling a component via an auxiliary coolant loop, including an expansion valve for controlling a flow of refrigerant to a refrigerant to air heat exchanger, a coolant to air heat exchanger coupled to the auxiliary coolant loop for regulating a temperature of the component, a second blower for creating an air flow through said refrigerant to air heat exchanger, a first blend door downstream of said refrigerant to air heat exchanger for directing the air flow through said coolant to air heat exchanger and/or an outlet into the passenger compartment, a second blend door downstream of said first blend door for directing the air flow through said outlet and/or a recirculation duct back to said second blower, and a third blend door downstream of said first blend door for controlling the air flow through said recirculation duct, wherein (a) the refrigerant to air heat exchanger, the first blend door, the second blend door, and the third blend door are positioned within an auxiliary HVAC case, (b) said first blend door directs a first portion of the air flow through said outlet and a second portion of said air flow through said coolant to air heat exchanger in a blended cooling mode and (c) said second blend door directs the second portion of air flow through said coolant to air heat exchanger through said outlet.

2. The vehicle of claim 1, wherein said component is one or more power storage devices.

3. The vehicle of claim 1, wherein said first blend door directs the air flow through said outlet in a passenger compartment cooling mode.

4. The vehicle of claim 1, wherein said first blend door directs the air flow through said coolant to air heat exchanger in a component cooling mode.

5. The vehicle of claim 4, wherein said second blend door directs the air flow through said third blend door and said recirculation duct in the component cooling mode.

6. The vehicle of claim 1, wherein said third blend door directs at least a portion of the second portion of air flow through said coolant to air heat exchanger through said recirculation duct.

* * * * *